Jan. 28, 1964   P. SCHLUMBOHM   3,119,143
COOL KNOB FOR HANDLING HOT ELEMENTS
Filed Aug. 30, 1961

INVENTOR

3,119,143
COOL KNOB FOR HANDLING HOT ELEMENTS
Peter Schlumbohm, 41 Murray St., New York 7, N.Y.;
Francis J. Gorman, executor of said Peter Schlumbohm, deceased
Filed Aug. 30, 1961, Ser. No. 134,910
4 Claims. (Cl. 16—118)

The invention refers to a cool knob for handling hot elements. The knob is designed to be gripped by the fingers of a person's hand. The invention solves the problem of keeping the knob cool enough to be touched with the bare fingers. The invention also creates a knob which offers a good grip to the fingers.

Following the invention, the knob is formed by a multitude of spikes, extending from a base plate. The base plate may form part of the wall of a lid or part of the wall of a pot or may be, on the opposite side of the spikes, the base for an elongated element such as a rod.

The invention is illustrated by way of example in FIG. 1 to FIG. 3 of the accompanying drawings.

Figure 2:
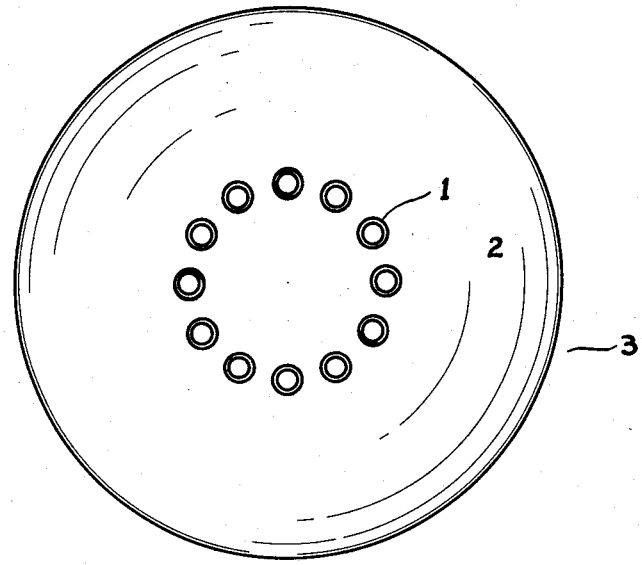
FIG. 2 is a top view of FIG. 1.
Figure 1:
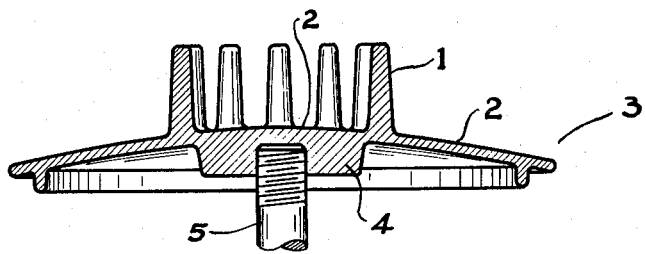
FIG. 1 is a side view of the knob, partly shown in vertical cross section.
Figure 3:
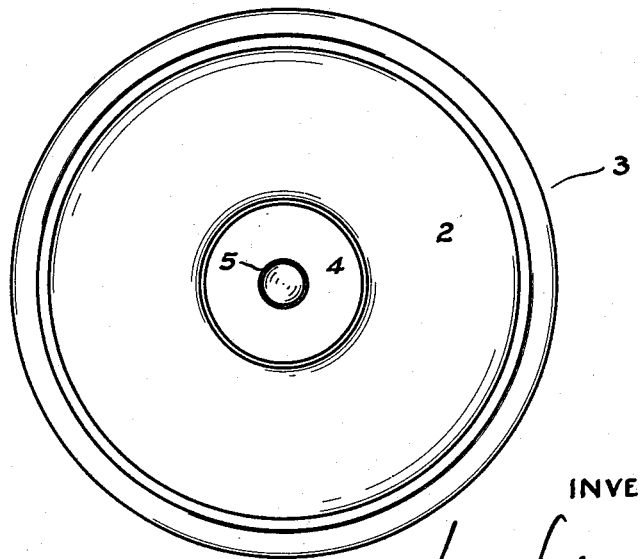
FIG. 3 is a bottom view of FIG. 1.

The illustrations show a knob with a multitude of spikes, in this example 12, extending substantially at a right angle from a base wall or plate 2 into the ambient air. As indicated above, the base wall 2 may be part of the wall of a lid 3. Where the spikes are located, the base wall 2 is thick enough to form a mounting base 4 at the side opposite the spikes in which, for example, a rod 5 might be fastened.

Following the invention, the spikes are arranged substantially parallel to and spaced from each other to form a fenced-in area. The base points follow the configuration of the contour of an imaginary conventional knob, for instance, the configuration of a circle, or of an oval, or of a rectangular shape or other closed circuit.

The effect of the structure is that the spikes with their great specific surface (ratio of surface:cubic content) are well cooled by the ambient air. Another effect is that the fingers are well anchored by resting partly on the surface of the spikes and partly being wedged into the space between two spikes.

The "cool" spikes can be gripped by the fingers as if they were gripping a knob of that configuration.

The spikes are slightly conical to facilitate molding the spikes and the base plate in one piece, for instance by injection molding or by molding in glass or ceramics or any other poor heat conductor.

Having now described the nature of my invention and given an example of the manner in which it may be performed, I claim as my invention:

1. A cool knob for a vessel subject to heat comprising a base plate having an upper and lower surface, a plurality of vertically disposed spikes, each spike having its lower end integral with said base plate and its remaining portion projecting freely from the upper surface of said base plate, said spikes being spaced and arranged in a continuous circuit to leave a fenced-in area therebetween and present the form of an imaginary knob, the spacing of said spikes being sufficient to provide when the spikes are manually gripped a substantial anchoring effect whereby the fingers rest partly on the surface of the spikes and are partly wedged into the spaced between adjacent spikes.

2. A knob as claimed in claim 1, in which the spikes are slightly conical, with the larger diameter near the base plate, to facilitate molding the base plate and the spikes in one piece.

3. A knob as claimed in claim 1, in which the base plate on the side opposite the spikes is thick enough to form a mounting base for an element to which the knob is attached.

4. A knob as claimed in claim 1, in which the base plate extends beyond the diameter of the configuration of the spikes.

References Cited in the file of this patent

UNITED STATES PATENTS

| | | |
|---|---|---|
| 168,858 | Washburne | Oct. 19, 1875 |
| 530,287 | Shoe | Dec. 4, 1894 |
| 547,305 | Turner | Oct. 1, 1895 |
| 1,299,321 | Gerrard | Apr. 1, 1919 |
| 2,284,748 | Korenek | June 2, 1942 |